Nov. 3, 1942.   W. A. DE HART ET AL   2,300,779
AUTOMATIC PHONOGRAPH
Filed May 24, 1940   7 Sheets-Sheet 3
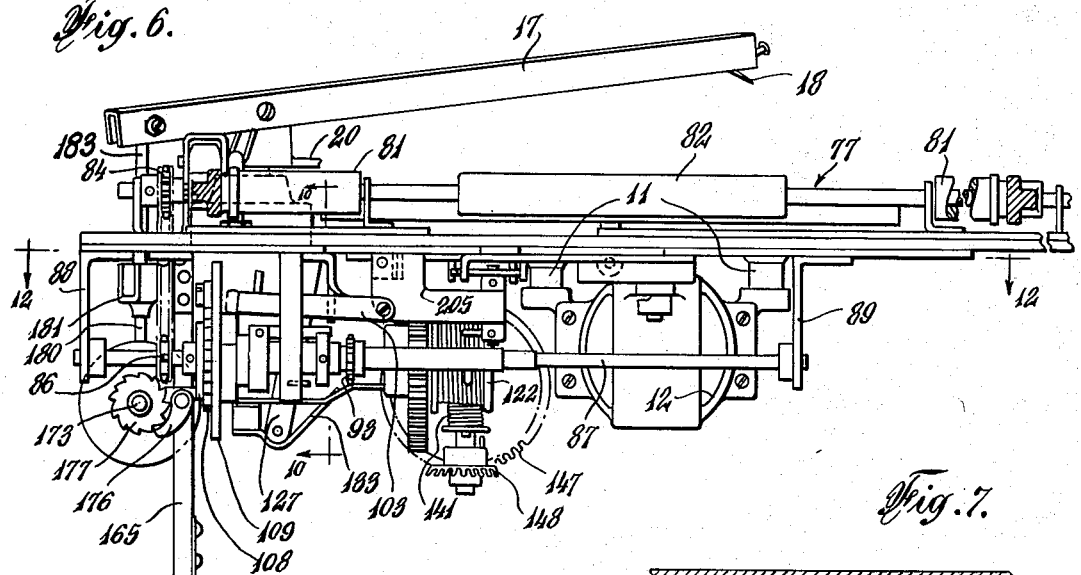
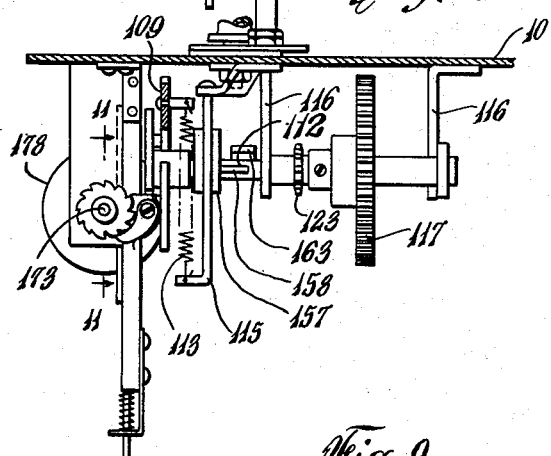
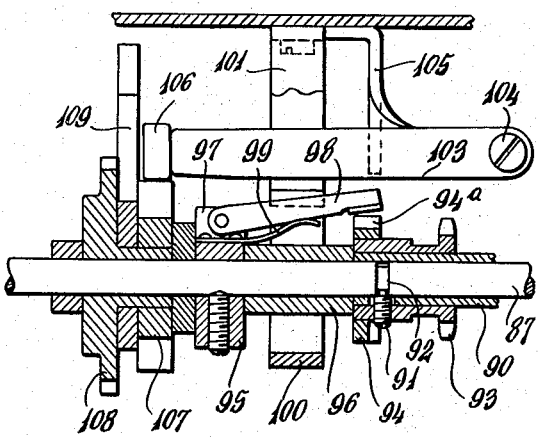
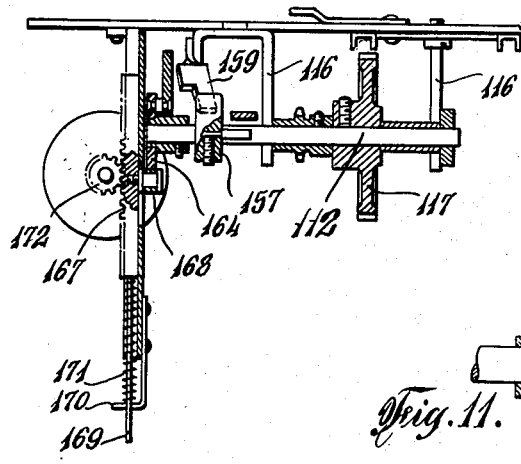
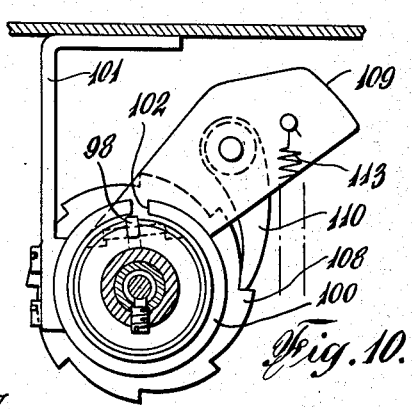
INVENTORS
William A. De Hart
Frederick A. Kolmetz
BY
A. V. Engel
ATTORNEY Nov. 3, 1942.  W. A. DE HART ET AL  2,300,779
AUTOMATIC PHONOGRAPH
Filed May 24, 1940　　7 Sheets-Sheet 4
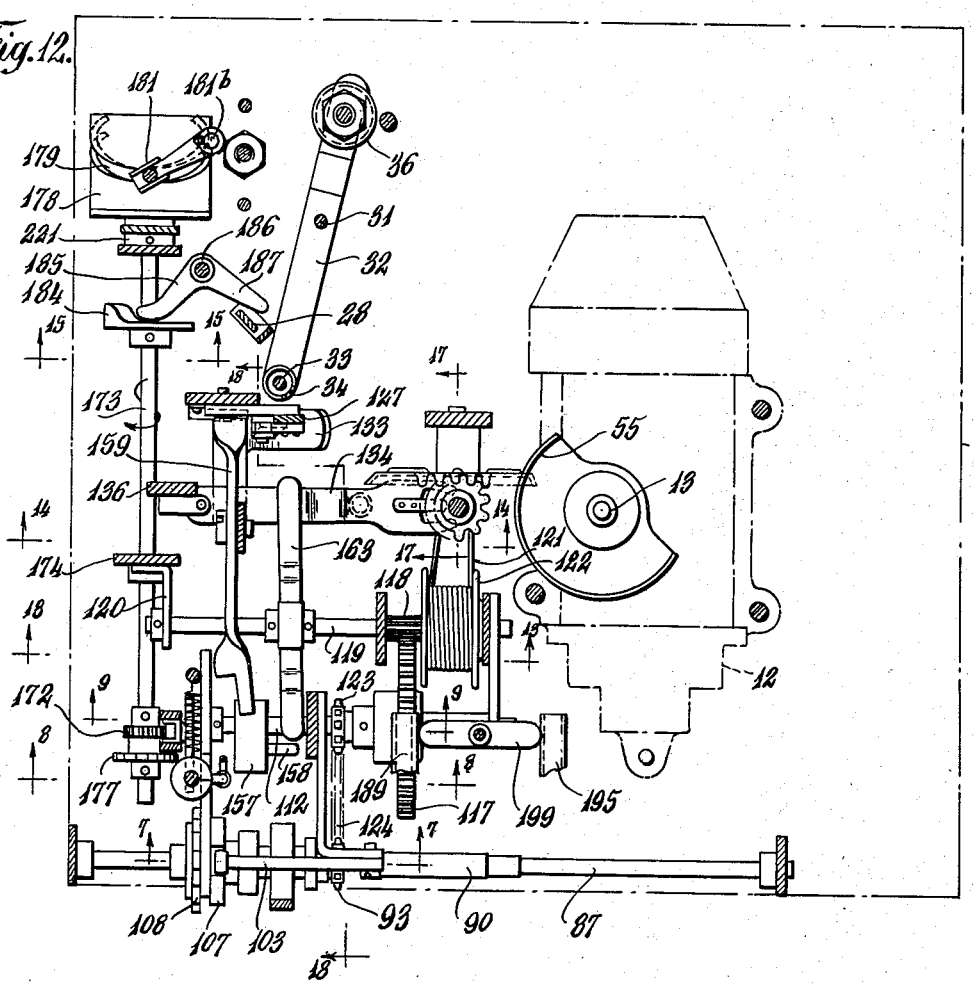
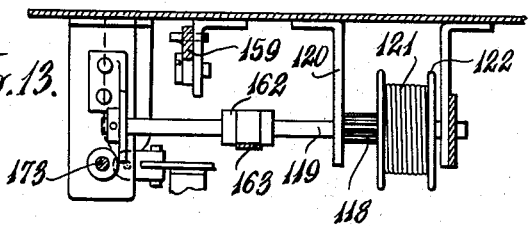
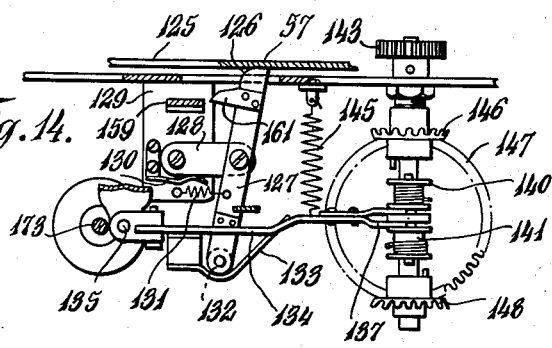
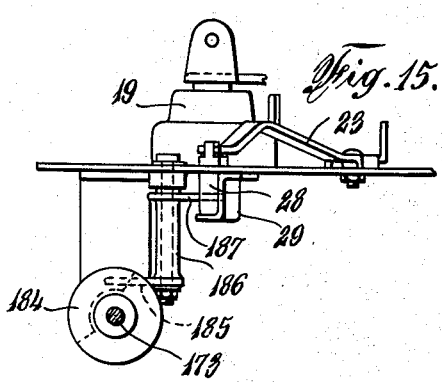
INVENTORS
William A. De Hart
Frederick A. Kolmetz
BY
O. V. Engel
ATTORNEY

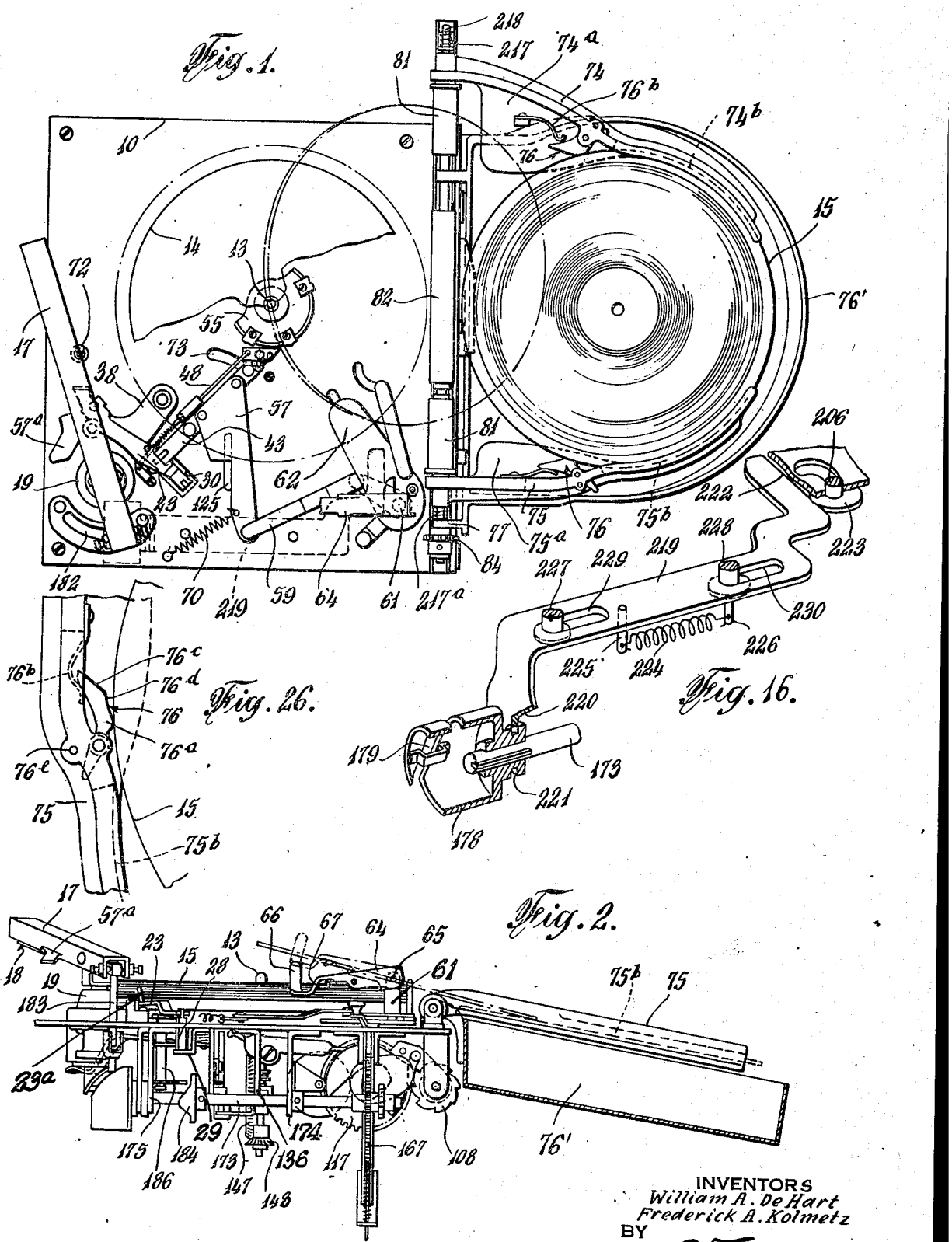

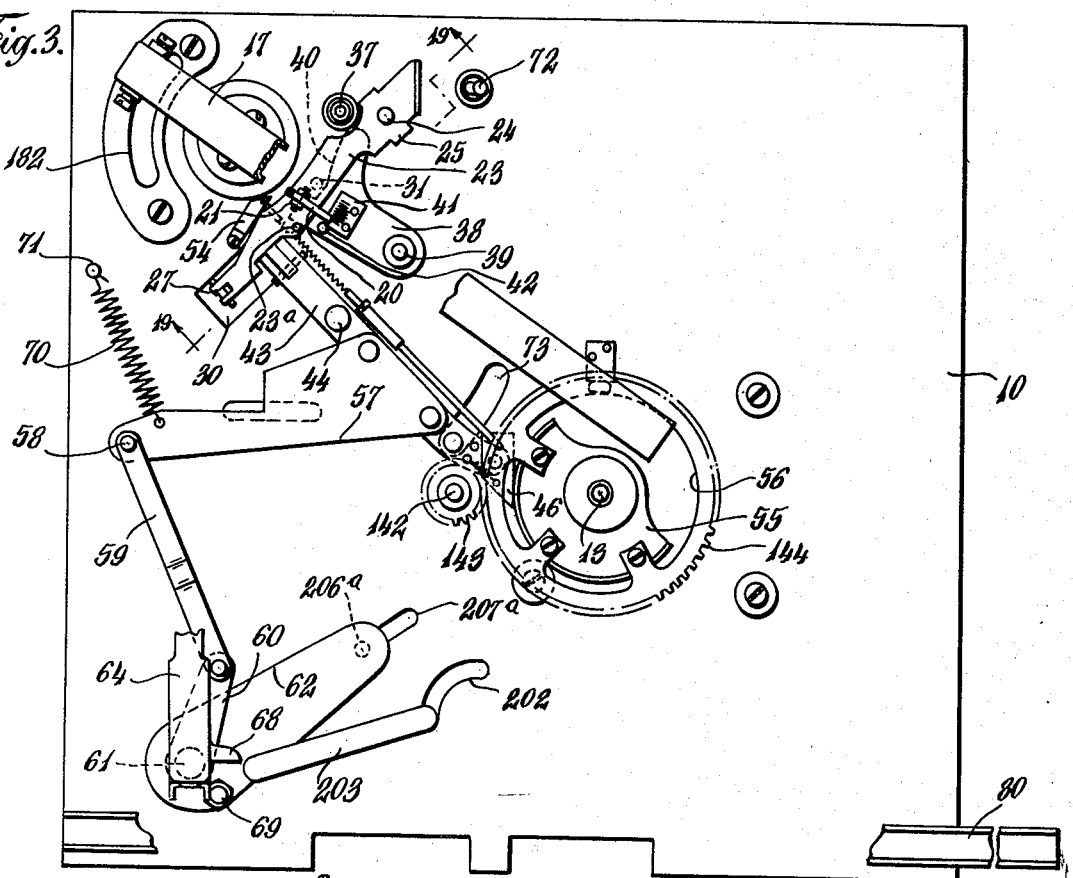
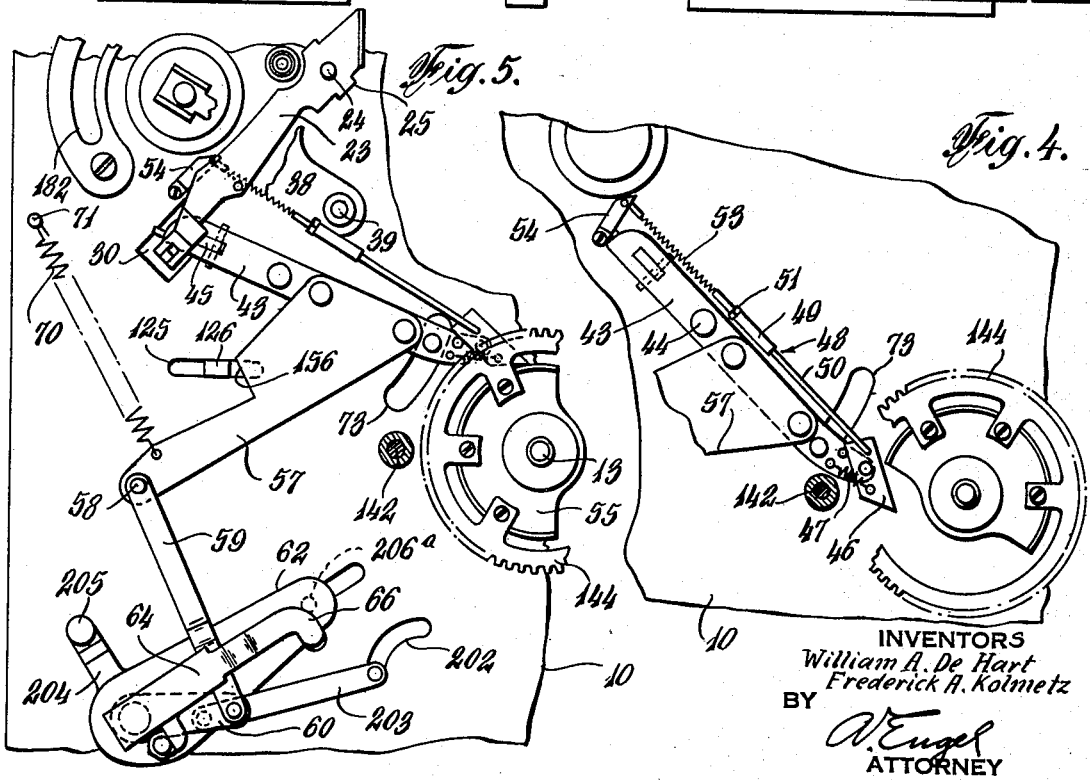

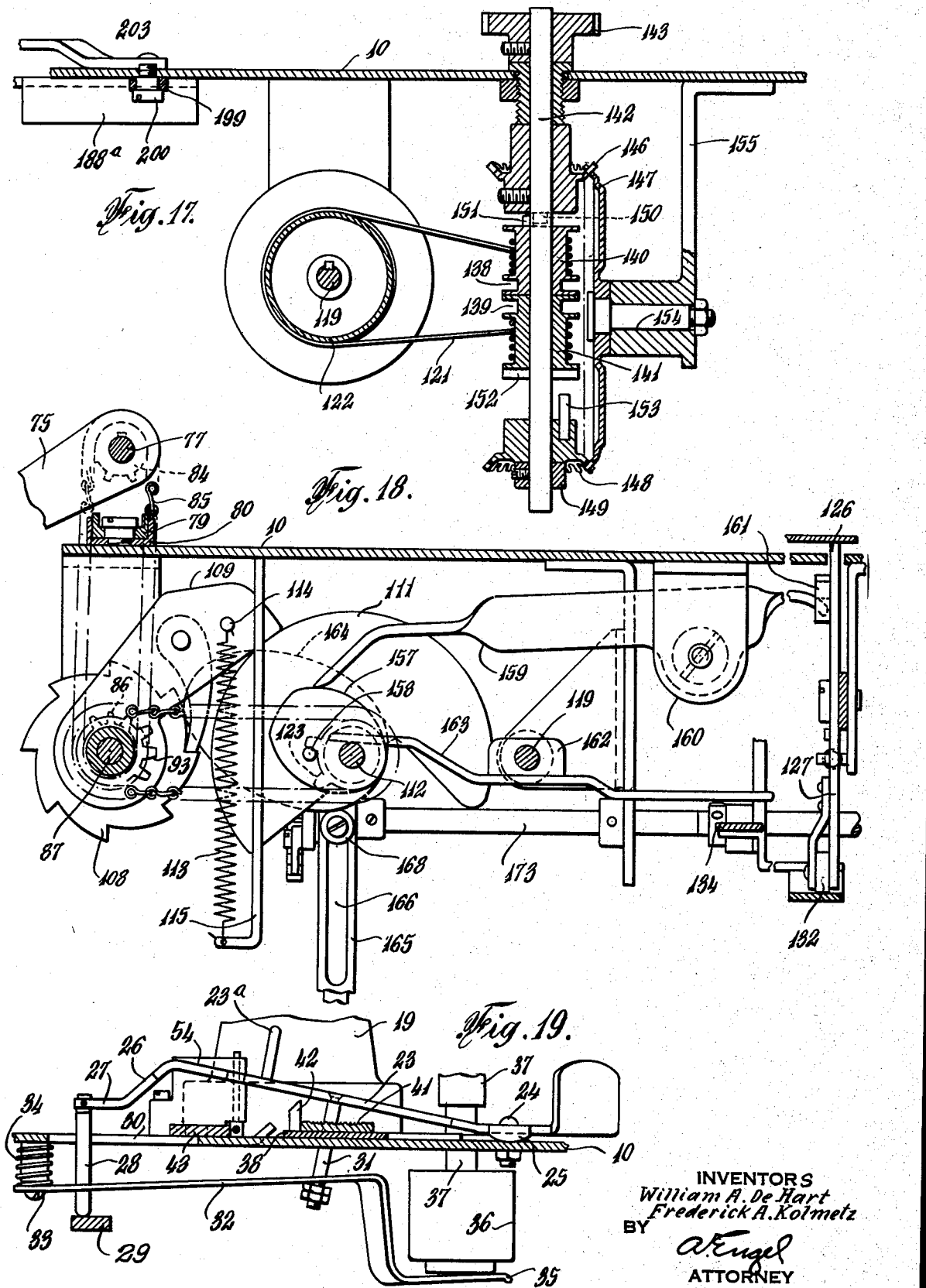

Nov. 3, 1942.   W. A. DE HART ET AL   2,300,779
AUTOMATIC PHONOGRAPH
Filed May 24, 1940   7 Sheets-Sheet 6
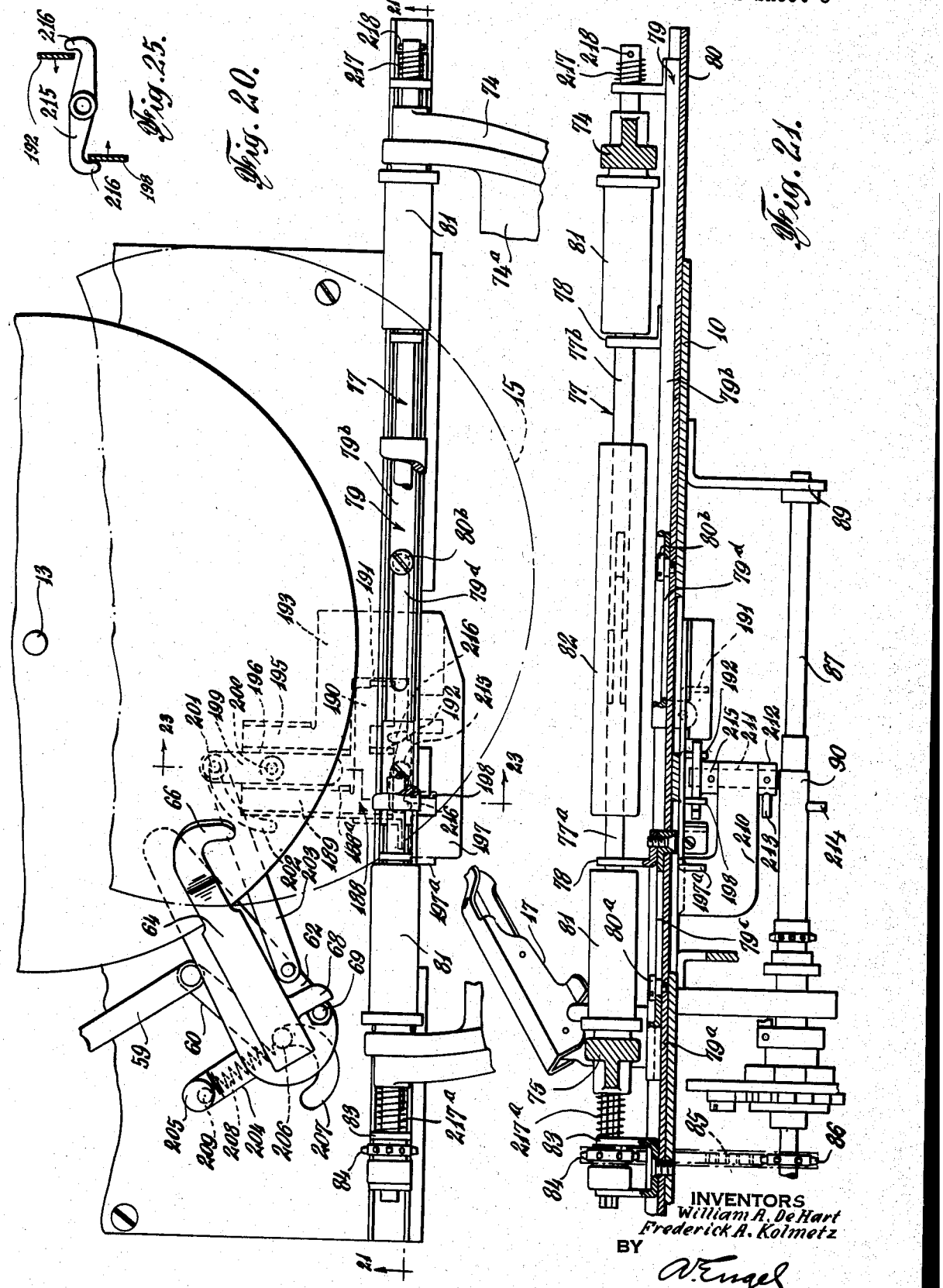
INVENTORS
William A. De Hart
Frederick A. Kolmetz
BY
A. V. Engel
ATTORNEY Nov. 3, 1942.　　　W. A. DE HART ET AL　　　2,300,779
AUTOMATIC PHONOGRAPH
Filed May 24, 1940　　　7 Sheets-Sheet 7
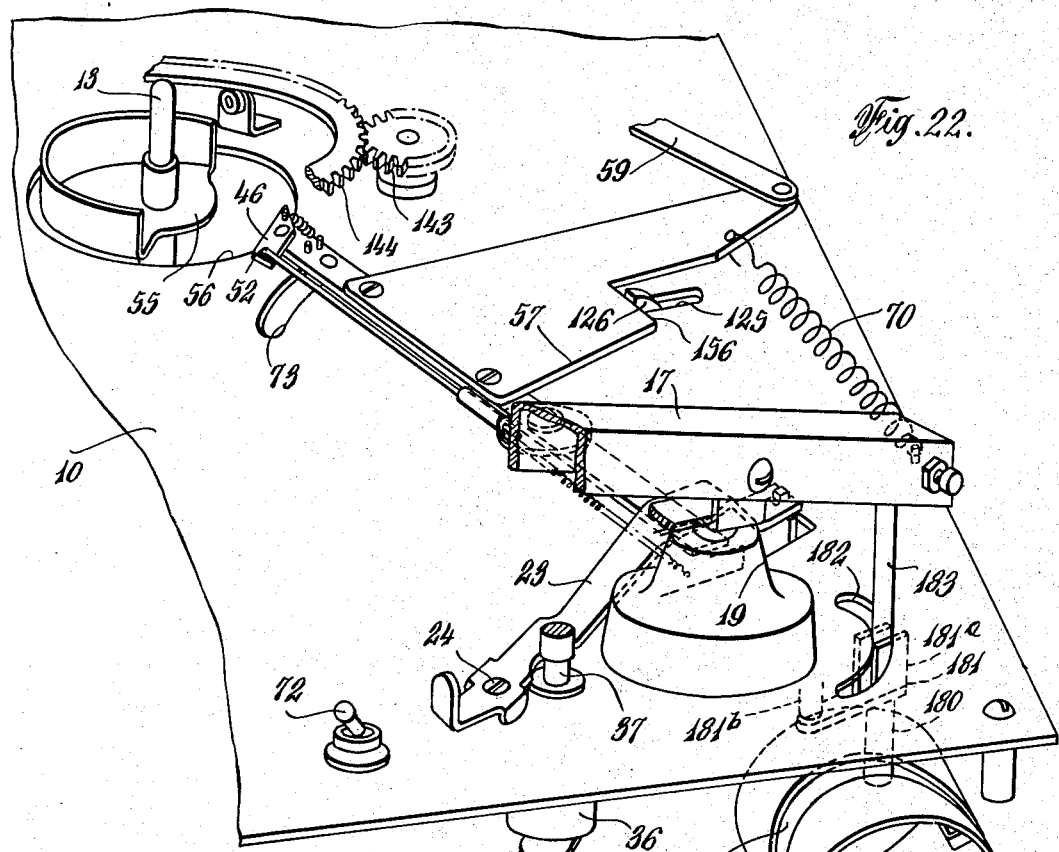
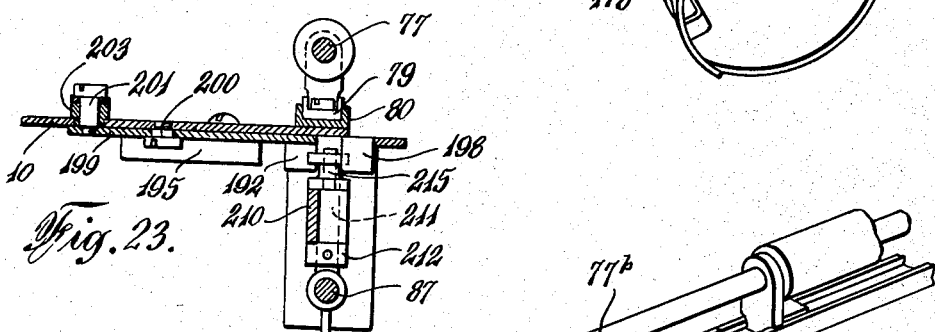
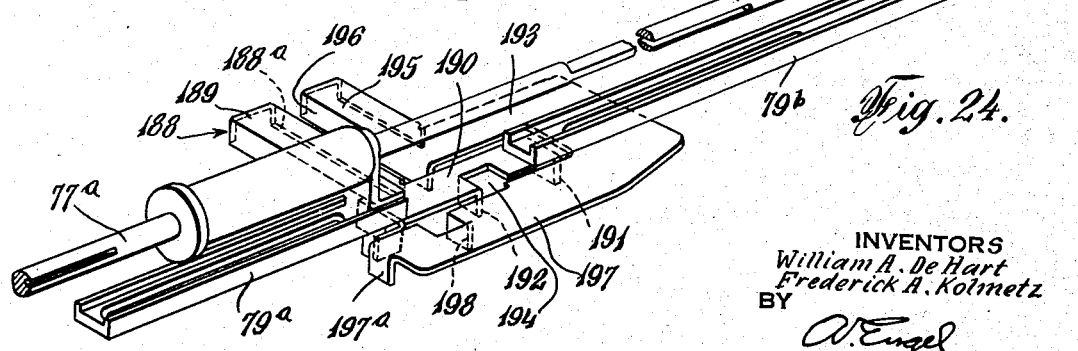
INVENTORS
William A. De Hart
Frederick A. Kolmetz
BY
A. Engel
ATTORNEY Patented Nov. 3, 1942

2,300,779

UNITED STATES PATENT OFFICE 2,300,779

AUTOMATIC PHONOGRAPH

William A. De Hart, Teaneck, N. J., and Frederick A. Kolmetz, Sunnyside, Long Island, N. Y., assignors to Liberty Music Shops, Inc., New York, N. Y., a corporation of New York Application May 24, 1940, Serial No. 336,972

13 Claims. (Cl. 274—10)

Our present invention relates to automatic phonographs and aims to provide certain improvements therein. More specifically it relates to automatic phonographs of the type described in the patent to Mitchell et al. #1,936,335 and Rich 2,198,294, and wherein a record after it has been reproduced is automatically raised over the central pin on the turntable and discharged laterally therefrom by the rotation of the turntable.

Although automatic phonographs made in accordance with the patented structures mentioned have met with great commercial success, there has been a crying need for a compact, economical automatic phonograph which can not only play a plurality of records in succession, but which can play both sides of each record in succession.

Accordingly, the primary object of our invention is to provide a simple, practicable and economical automatic phonograph which will play both sides of each of a stack of records mounted on a turntable in succession. A further object is to provide such device which is compact and of light weight so that it may be embodied in a portable unit if desired. A further object is to provide such device having selective adjusting means whereby either a stack of 10" or 12" records mounted on the turntable may have both sides of each record played in succession.

The foregoing and other objects of our invention not specifically enumerated we accomplish by providing an automatic phonograph of the type wherein the turntable is adapted to support a stack of records, the topmost of which is laterally dischargeable from the turntable, means for receiving the record upon its discharge, means for replacing the record on the turntable with the side opposite to that last played facing upwardly, and means for discharging the record from the receiving means onto a supporting means after both sides have been played, whereby the next and succeeding records of the stack will each have both sides presented for playing before being deposited onto the supporting means. The invention also embodies the various novel mechanisms and combinations thereof for accomplishing the foregoing operations.

The invention will be better understood from the detailed description which follows when considered in connection with the accompanying drawings, wherein:

Figure 1 is a top plan view of the device with the parts set for playing 12" records.

Fig. 2 is a side elevation of the device as viewed from the lower side of Fig. 1.

Fig. 3 is a top plan view showing the parts of the mechanism at the conclusion of the playing of a record, the turntable and other operating parts of the mechanism being omitted.

Fig. 4 is a fractional detail plan view of the replay setting mechanism as shown in Fig. 3 showing the parts in the relation when a record is to be discharged from the turntable.

Fig. 5 is a fractional detail plan view showing the relationship of the replay setting mechanism after a record has been discharged from the turntable.

Fig. 6 is a side elevation of the mechanism as viewed from the lower side of Fig. 3.

Fig. 7 is a sectional detail taken substantially along the plane of the line 7—7 of Fig. 12.

Fig. 8 is a sectional detail taken substantially along the plane of the line 8—8 of Fig. 12.

Fig. 9 is a sectional detail taken along the plane of the line 9—9 of Fig. 12.

Fig. 10 is a sectional detail taken substantially along the plane of the line 10—10 of Fig. 6.

Fig. 11 is a sectional detail taken along the plane of the line 11—11 of Fig. 8.

Fig. 12 is a sectional detail taken along the plane of the line 12—12 of Fig. 6 or in other words a plan view of the mechanism with the top plate removed.

Fig. 13 is a section taken along the plane of the line 13—13 of Fig. 12.

Fig. 14 is a section taken along the plane of the line 14—14 of Fig. 12.

Fig. 15 is a section taken along the plane of the line 15—15 of Fig. 12.

Fig. 16 is a perspective view of the mechanism for controlling the setting of the drum cam which operates to clear the reproducer arm from the records on the turntable after the completion of the reproduction of a record and its discharge from the turntable.

Fig. 17 is an enlarged section taken along the plane of the line 17—17 of Fig. 12.

Fig. 18 is an enlarged section taken along the plane of the line 18—18 of Fig. 12.

Fig. 19 is an enlarged section taken along the plane of the line 19—19 of Fig. 3.

Fig. 20 is an enlarged detail plan view of the record receiving and replacing mechanism with parts broken away, the mechanism being set for operating with 10" records.

Fig. 21 is a section taken along the plane of the line 21—21 of Fig. 20.

Fig. 22 is a perspective view of the replay setting mechanism.

Fig. 23 is a section taken along the plane of the line 23—23 of Fig. 20.

Fig. 24 is a perspective view of the adjusting means for the record receiving and replacing mechanism.

Fig. 25 is a top plan view of a detail of the invention.

Fig. 26 is an enlarged detail of one of the record holding latches shown in Fig. 1.

Referring first to Figs. 1 to 6, 14, 19, and 22 of the drawings, the numeral 10 indicates a supporting table from the underside of which depends a pair of brackets 11 (Fig. 6) which support an electric motor 12 having a vertical spindle to which is connected a central pin 13 extending upwardly through the supporting table upon which pin there is mounted for rotation therewith a turntable 14 adapted to support a stack of records 15, over the top face of the uppermost of which a reproducer arm 17 is adapted to ride in the conventional clockwise direction, and in doing so reproduce the sound recorded on the sound track of the record. The reproducer arm 17 has mounted in the free end thereof a reproducing unit (not shown) having a pick-up needle 18, the said reproducer arm being pivotally mounted upon a boss 19 upon a vertical pivot so as to swing laterally and also upon a horizontal axis so as to swing vertically.

*Control of the reproducer*

Mounted on the underside of the reproducer arm is a substantially U or V-shaped support 20 (similar to the part 48 in the Mitchell et al patent referred to) adapted to pivot about a pin 21, the lower arm of said support having a roller 22 adapted to ride over a tilting arm 23, one end of which is loosely secured to the table 10 by a screw 24, the said arm adjacent said mounting having downwardly bent lugs 25, the lower faces of which are rounded and rest upon the table top as best shown in Figs. 3, 19 and 22. The tilting arm 23 adjacent its opposite end has a downwardly directed oblique portion 26 and a bifurcated end 27, which pivotally carries a dog 28 which in inactive position extends downwardly over a supporting arm 29 (Figs. 2 and 15) mounted on the underside of the table, there being an opening 30 in the table to permit the end 27 of the tilting arm and the dog 28 to move therein. The tilting arm 23 intermediate its ends has an upstanding pin 23a and extending downwardly from the underside of said plate 23 is a headed pin 31 which passes through an opening in the table and through an opening in an angular plate 32, one end of said plate being mounted upon a headed pin 33 and held in engagement with said head by a spring 34 and the other end of which is downwardly bent and offset as indicated at 35 and extends below a dash pot 36 to move a plunger 37 thereof upwardly, as will be presently explained.

Mounted on the table beneath the tilting arm 23 is a plate 38 which is pivoted at 39, the portion of the plate underlying the tilting arm being formed with a V-shaped notch 40 within which the pin 31 on the tilting plate is movable. Mounted on the plate 38 is a serrated plate 41 having an upstanding stop pin 42.

Disposed to one side of the plate 38 and also extending beneath the tilting arm is a control lever 43 which is pivotally mounted on the table top at 44, the end of said lever which underlies the tilting arm having an inclined or wedge-like lug 45, the opposite end of said lever being pivotally connected to a dog 46 having a pointed end, the latter being biased by a spring 47. Extending in normal operating position substantially parallel to the control lever 43 is a tension member 48 consisting of a sleeved member 49 and a pin 50 telescoping therewith, the pin 50 having an adjustable nut 51 at one end thereof to limit its movement in one direction and at its other end being provided with an angular bent portion 52 (Fig. 22) which engages an opening in the dog 46. The member 49 is connected through a tension spring 53 to one end of a pivoted dog 54 disposed to the rear of the tilting arm 23 substantially opposite the end of the lever 43.

Secured to the motor shaft or center pin 13 is a control member or cam 55 which is rotatable within an opening 56 within the table, the surface of the cam extending slightly above the upper surface of the table in position to engage the pointed end of the dog 46.

*Record discharge mechanism*

Referring now to Figs. 1 to 5 and 20 of the drawings, there is shown as rigidly connected to the control lever 43 one end of a plate 57, the opposite end of which is pivotally connected at 58 to one end of a link 59, the opposite end of which link is connected to one end of a lever 60, the opposite end of which in turn has an upstanding cylindrical portion mounted on an upstanding pivot pin 61 carried by a plate 62 which is movable in guided relation over the top face of the table 10, for a purpose which will be presently explained. Mounted adjacent the top of the cylindrical portion of the lever 60 is an arm 64 adapted to swing about a horizontal pivot 65 (Fig. 2). The free end of the arm 64 has an upwardly curved finger 66 and disposed beneath said curved finger and of shorter length than it, is a spring finger 67, the free end of which may flex relatively to the finger 66. Also carried by the arm 64 is a laterally extending ear 68, one edge of which is adapted to engage an upstanding pin 69 as the arm is moved about its pivot, such engagement operating to cause an upward pivoting of the arm 64 about its pivot or horizontal axis 65. Normally the parts assume the relation shown in Figs. 1 and 3 in which relation they are held by a tension spring 70 connected at one end to the plate 57 and at its opposite end to a fixed anchorage 71.

The parts thus far described are substantially similar to or the equivalent of the corresponding mechanism in the patents to Mitchell et al. and to Rich above referred to and in operation function substantially as follows:

A stack of records 15 of a given diameter such as 10" or of 12" are mounted on the turntable to the extent of the height of the center pin 13. The parts of the mechanism are set for the playing of either 10" or 12" records, as will be explained more in detail hereinafter. The pick-up needle 18 is placed upon the outer edge of the sound track of the uppermost record and the control switch 72 is then operated to energize the motor 12 to cause rotation of the turntable and the records thereon and thereby the reproduction of the topmost record takes place and may be heard through an amplifying circuit and loud speaker or any mechanical or electrical sound reproducing means (not shown), well known in the art.

The cam 55 rotates with the turntable but fails to engage the pointed end of the dog 46 which is held in inoperative and non-engaging position by the spring 47. When the reproducer arm pick-up, in moving in a clockwise direction runs into the lead-in groove at the end of the record the lower arm of the V-shaped support 20 will engage the pin 42 thereby moving the plate 38 in a counter-clockwise direction. In the course of this movement one wall of the V-shaped notch 40 will thereby press against the pin 31 on the tilting arm 23 to move said arm in a clockwise direction about the pivot screw 24. This movement presses the tilting arm against the pivoted dog 54 which applies tension of the sleeve member 49 of the tension member 48 sufficient to overcome the tension of the spring 47, thereby tilting the dog 46 into the position shown in Fig. 4. When the cam 55 strikes the end of the dog 46 it acts to perform several functions substantially simultaneously as follows:

As the dog is carried around by the cam to the limit of movement provided by a slot 73 in the table, the lever 43 is moved about its pivot 44 so that the opposite end thereof is caused to ride under the tilting lever 23 and in doing so engage the oblique portion 26 thereof causing said lever to rock about its ears 25. As the lever 23 is tilted it raises the dog 28 into upstanding relation upon the supporting arm 29. The raising of the lever 23 lifts the tone arm from the record and because of the resulting inclination of the tilting lever 23 the tone arm will then ride down the incline out toward the periphery of the record. As the lever 23 is raised it also operates through the pin 31 to raise the plate 32 beneath the table so that the end 35 of said plate engages the plunger 37 to raise the same through the dash pot 36. In the course of returning the reproducer arm to its outermost position, the laterally extending ear 57a on the reproducer arm engages over the top of the plunger 37 by which it is supported in elevated position. Movement of the reproducer arm in a clockwise direction upon being raised from the record is limited by the upstanding pin 23a (Figs. 1, 2, 3 and 19).

Simultaneously with the above actions the movement of the control lever 43 will through the link 59 cause the lever 60 to move in a clockwise direction about the pivot 61 which will move the arm 64 in a clockwise direction toward the records. The upwardly curved finger 66 will thereupon ride up and over the periphery of the topmost record, until the spring finger 67 is positioned to slide under the topmost record. Continued inward movement will cause the spring finger 67 to separate the topmost record from the one immediately below it and grip the peripheral edge thereof in conjunction with the finger 66. Continued inward movement of the arm 64 will cause the ear 68 to engage the pin 69 and swing the arm vertically so as to lift the edge of the record, arresting its rotation until the center opening therein is free from the upper end of the center pin. However the opposite edge of the record will remain in engagement with the group of records on the turntable, the speed of rotation of which will throw the engaging edge of the elevated record outwardly and away from the turntable to be received by the inwardly directed arms 74 and 75. These arms have supporting and guiding ledges 74a and 75a which lead into grooves 74b and 75b formed in the inner faces of the arms to receive the record. The arms 74 and 75 are mounted for movement toward and away from each other to accommodate either a 10" or a 12" record, as will be hereinafter explained, and are so shaped that when set to accommodate either of such records, the record will be received and held in a position such that the central opening therein will be at the same radial distance from the axis upon which the arms are rotatable, as is the central pin 13.

For holding a record within the arms so that the arms can replace said record on the turntable with the side opposite to that last reproduced facing upwardly, latches 76 are carried by said arms. The latches 76 of which the one mounted on the record receiving arm 75 is shown in detail in Fig. 26 each consists of a dog 76a which is pivotally mounted intermediate its ends upon one of the arms 74 and 75 and is biased inwardly by a leaf spring 76b, the arms being recessed to accommodate the ends of the dogs. The inner face of each dog is formed with surfaces 76c and 76d, the surface 76c being adapted to be first engaged and moved outwardly by a record as it is discharged from the turntable to permit the record to pass said dogs to be received within the record receiving arms, and the surface 76d being adapted to overlie the periphery of the record above its diameter after it has passed the dogs in entering the grooves 74b and 75b in the arms 74 and 75 respectively and the dogs have again moved inwardly under the force of springs 76b and function to hold said record against movement within said arms while they are being pivotally moved from their normal record receiving position in which they extend laterally outwardly from the turntable to their record replacing position in which they extend in overlying relation to the turntable. For limiting the inward movement of each of the dogs 76a by the spring 76b each record receiving arm is provided a stop pin 76e. Disposed below the arms 74 and 75 when in normal record receiving position, is a record receiving tray 76' into which a record may be deposited by gravity from the receiving arms after both faces of the record have been reproduced, as will be presently explained.

*Record receiving and operating mechanism*

Referring to Figs. 6, 12, 20 and 21, the record receiving arms 74 and 75 are fixedly mounted upon a shaft 77 consisting of a pair of telescoping driving members 77a and 77b supported in upright bearings 78 carried by a two-part channel member 79 the parts of which are slidable within a second fixed channel member 80 supported on the table 10 adjacent one edge thereof. Mounted on the shaft 77 are freely rotatable rollers 81 and 82 which provide a rolling support for the discharge of a record from the turntable into the record receiving arms. Fixedly carried by the shaft 77a adjacent the left end thereof in a bearing 83 is a sprocket wheel 84 over which is trained a sprocket chain 85 which is also trained over a sprocket wheel 86 fixedly mounted on a shaft 87 which is supported in suitable bearings 88, 89 from the underside of the table 10 and in substantially vertical parallel alignment with the shaft 77.

Mounted on the shaft 87 is a sleeve 90 adapted to rotate relatively to the shaft but immovable longitudinally with respect thereto in view of a set screw 91 which extends through said sleeve and into an annular groove 92 in said shaft (Fig. 7). Mounted on the sleeve 90 for rotation therewith is a sprocket wheel 93 having a hub which carries a split ring 94, the split providing an axial groove 94a. Also fixedly mounted on the shaft 87 to the left of the split ring 94 is a ring 95 which is held in spaced relation to the ring 94 by a spacer sleeve 96, the ring 95 being formed with an axial groove 97 within which is pivotally mounted one end of a dog 98 which is biased outwardly by a spring 99, the free end of said dog being adapted under certain conditions to engage within the axial groove 94a in the ring 94. Encircling the spacer sleeve 96 is a split ring 100 which is fixedly supported in position by a depending bracket 101. The split or groove 102 in said ring 100 is disposed at the top thereof and directly overlying said groove is a pivoted lever 103, one end of which is pivotally mounted at 104 to a depending bracket 105, the opposite end of said lever having mounted thereon a roller 106 which rides over the surface of a four-armed cross cam 107 which is fixedly carried on the hub of a ratchet wheel 108 which in turn is loosely mounted on the shaft 87. Also mounted on the hub of the ratchet wheel 108 and adapted to rotate relatively thereto is an arm 109 which carries a spring pressed pawl 110 for engaging the teeth of the ratchet wheel 108. The free end of the arm 109 is adapted to ride over the surface of a cam 111 mounted on a shaft 112 (Fig. 18) and for holding said arm in engagement with said cam surface, there is provided a tension spring 113, one end of which is anchored to a pin 114 on the arm and the other end of which is anchored to a rigid support 115 depending from the table 10.

When the parts are in the position shown in Fig. 7, that is, when the roller 106 on the lever 103 is resting on a high point of the star cam 107 the dog 98 is pressed outwardly by its spring 99 through the groove 102 in the ring 100 and hence the ring 94 will be free to rotate around the shaft 87 when the sprocket wheel 93 is rotated. In other words, in said position of the parts rotation of the sprocket wheel 93 will not rotate the shaft 87. When the star cam 107 is advanced 45° by the ratchet wheel 108 the roller 106 will drop by gravity onto a low point of the cam, the weight of the lever 103 pressing upon the dog 98 will move it against the tension of its spring 99 into the groove 94a as the sprocket wheel 93 is rotated and thereby cause rotation of the shaft 87. Accordingly, when the parts are in the position just described, rotation of the sprocket wheel 93 will rotate the shaft 87 and with it the sprocket wheel 86, rotation of which will be transmitted through the sprocket chain 85 to sprocket wheel 84 and cause rotation of the shaft 77 which carries the record receiving arms 74 and 75.

The shaft 112 is supported in bearings on depending brackets 116 (Figs. 8 and 9) and rotation is imparted to said shaft by means of a gear wheel 117 in mesh with a pinion 118 mounted on a shaft 119 supported in brackets 120. Rotation is imparted to the shaft 119 by unwinding a cable 121 from a drum 122 fixedly carried by said shaft in a manner to be presently explained (see Figs. 12, 13 and 17). Also mounted on the shaft 112 and in alignment with the sprocket wheel 93 on shaft 87, is a sprocket wheel 123 and trained over the sprocket wheels 123 and 93 is a sprocket chain 124 through which rotation is imparted to the shaft 87 under certain conditions to be explained.

Referring now to Figs. 1, 6, 12, 14, 17 and 18, I will now explain how rotation is imparted to the shaft 87. Extending upwardly through a slot 125 in the table and normally disposed beneath the plate 57 is a round nosed end 126 of a lever 127 which is pivotally supported intermediate its ends by a link 128 mounted on a depending bracket 129, the said lever being normally urged upwardly by a leaf spring 130 and outwardly, that is toward the uncovered end of the slot 125, by a spring 131, the opposite or lower end of the lever carrying a roller 132. Normally, the roller 132 seats upon the low portion of an upwardly extending arm 133 which is carried by a lever 134, one end of which is pivotally mounted as at 135 to a depending bracket 136 (Figs. 2 and 12) and the other end 137 of which is both bifurcated and forked to engage within and around the grooves adjacent the ends 138 and 139 of a pair of spools 140 and 141 respectively which are loosely mounted on a vertical shaft 142 which extends up through the table and fixedly carries at its upper end a pinion 143 which is in mesh with a gear wheel 144 (see Figs. 3 and 22), which gear wheel is carried by and rotatable with the cam 55. The lever 134 is biased upwardly by a tension spring 145, as best shown in Fig. 14. Fixedly carried by the shaft 142 is a miter pinion 146 which is in mesh with a miter gear 147 which latter is in mesh with a second miter pinion 148 loosely mounted on the shaft 142. The pinion 148 is supported on the shaft 142 by a stop collar 149. The under face of the hub of the miter pinion 146 is provided with a depending lug 150 which is adapted to cooperate with an upwardly extending lug 151 on the spool 140 and the lower face of the spool 141 is formed with a diametrical rib 152 which is adapted to cooperate with an upstanding pin 153 on the hub of the pinion 148. The miter gear 147 is suitably supported upon a stud 154 mounted in a depending bracket 155. The spools 140 and 141 have the opposite ends of the cable 121 attached thereto, several convolutions of the cable extending around the spools and the intermediate portion of the cable extending in several convolutions about the rotatable drum 122 which is fixedly carried on the shaft 119.

When a record is being discharged from the turntable by the operation of control lever 43 whereby the arm 64 with its spring fingers 66 and 67 are operated, as hereinbefore explained, the plate 57 is moved to the position shown in Fig. 5, whereby the nosed end 126 of the lever 127 is uncovered and under the force of the springs 130 and 131 it is moved outwardly in the slot 125 so that when the plate returns to its normal position after the record has been discharged the nosed end 126 is engaged by a shoulder 156 on the plate 57 and held in extended position. As the nosed end 126 moves outwardly the roller 132 at the opposite end of said lever rides upwardly along the upwardly extending arm 133 depressing the same and with it the lever 134 by which said arm is carried. This action forces the spool 141 downwardly into locking engagement with the rotating pinion 148 whereby rotation is imparted to the spool 141. This rotation unwinds the cable 121 from the drum 122 and in doing so rotates the shaft 119, and thereby through the pinion 118 and gear wheel 117 and sprocket wheel 122 drives the sprocket chain 123 to rotate the sprocket wheel 93 and therethrough operate the arms 74 and 75 of the record replacing mechanism.

Mounted on the shaft 112 is a control cam 157 which has a laterally extending pin 158 eccentrically mounted thereon. Bearing on the surface of the cam 157 is one end of a gravity activated lever 159 which is pivoted to a depending bracket 160, the opposite end of said lever being adapted to seat upon a lateral offset dog 161 on the lever 127 when the latter is moved outwardly in the slot 125 upon the discharge of a record. When the lever 159 rides over the high of the cam 157 it operates to depress and shift the lever 127 against the tension of the springs 130 and 131 to move it beneath the plate 57. Mounted on a bearing 162 loosely carried by the shaft 119 is a lever 163, the underface of one end of which is adapted to be engaged by the pin 158 on the cam 157 during the normal operation of the machine; that is when a record is being played the cam 157 is stationary and the pin 158 engages below the lever 163 to hold one end of said lever upwardly and the other end in its lowermost position at which it engages the lever 134 and presses it downwardly against the tension of the spring 145. In this position the lever 134 operates to hold the spools 140 and 141 in a neutral position between and out of engagement with the miter pinions 146 and 148.

The period of rotation of the spool 141 in unwinding the cable from the drum 119 is governed by the control cam 157, the extent of rotation of which is such that when the record receiving arms have moved from a record receiving position extending laterally downwardly from the turntable to a position overlying the turntable, the high of the cam 157 will move from its normal position to raise the end of the lever 159 to trip the dog 161 on the lever 127. This action removes the downward force upon the arm 133 whereby the spring 145 operates to disengage the spool 141 from the pinion 148 and move the spool 140 into engagement with the pinion 146. This action causes an unwinding of the cable from the drum onto the spool 140 and the winding of the cable onto the drum from spool 141 thereby rotating the drum in the opposite direction, which action also rotates the various parts controlled by the rotation of the drum in the opposite direction and moves the record receiving arms from the position overlying the turntable to its initial position extending laterally downwardly from the turntable. When this action is completed the pin 158 will again have been brought under the end of the lever 163 to raise the same and move the lever 134 into neutral position.

*Control of reproducer arm beyond periphery of the records on turntable*

On the shaft 112 for rotation therewith there is also mounted a cam 164. Dependingly mounted from the underside of the table and extending across the face of the cam 164 is a channel member 165 having a slot 166 through the base thereof. Mounted in said channel member for movement therein is a rack 167 the back of which carries a pin extending through said slot and mounted on said pin is a roller 168. Extending downwardly from the bottom of the rack is a pin 169 which extends through a guide opening in a flange 170 and surrounding said pin is a spring 171 which acts to urge said rack upwardly. The cam 164 in its movement engages the roller 168 to move the rack downwardly while the spring 171 operates to move the rack upwardly and maintain the roller in contact with the cam. In mesh with the rack 167 is a pinion 172 which is loosely mounted on a shaft 173 supported in bearings 174 and 175 depending from the underside of the table. Carried by a hub on the pinion 172 is an arm which carries a spring pressed pawl 176 (Figs. 6 and 11) which is adapted to engage the teeth of a ratchet wheel 177 fixedly mounted on the shaft 173.

As the high of the cam 164 moves downwardly with the rotation of shaft 112 it moves the rack 167 downwardly and in doing so rotates the shaft 173. In view of the ratchet mounting on the pinion it will be noted that the shaft 173 is only rotated as the rack is moved downwardly. After the high of the cam has passed the lowermost point in its rotation and moves upwardly the rack is moved upwardly by the tension of the spring 171 acting thereon, but in the course of this action the pawl slips around the ratchet wheel and hence does not rotate the shaft. In other words it is only when the rack moves downwardly that the shaft 173 is rotated. Mounted at the opposite end of the shaft 173 is a drum 178 having a substantially U-shaped cam groove 179 in its surface within which extends a pin 180 depending from a bifurcated end 181a on an arm 181 which is pivotally mounted on a pin 181b depending from the table 10 (Fig. 22). Extending into the bifurcated end of the arm 181 through an arcuate slot 182 in the table is a pin 183 which is dependingly carried at the rear end of the reproducer arm 17, the connection between the pin 183 and the reproducer arm being such as to permit said reproducer arm to pivot about an axis disposed at a right angle to the axis of the pin.

Also mounted on the shaft 173 is a cam 184 which in the course of its rotation is adapted to engage one arm 185 of a bell crank lever 186, the other arm 187 of which is adapted to engage and trip the dog 28 carried by the end 27 of the tilting arm 23. The bell crank lever 186 is biased by a spring (not shown) to return it into operative relation to the cam after tripping the dog.

When a record is to be discharged by the mechanism as hereinbefore explained, the reproducer arm is returned to the outer periphery of the record and held in elevated position off the record by the seating of ear 57a upon the plunger 37. In the replacement on the turntable of a record by the record receiving arms it will be noted that the reproducer arm would hinder such replacement unless removed beyond the outer periphery of the record. To obviate this, the reproducer arm is moved outwardly while the record receiving arms are being moved from the record receiving position to the record replacing position. The movement of the record replacing arms is controlled by the unwinding of the cable from the drum 122 onto the spool 141 and it is this same unwinding action which controls the movement of the reproducer arm outwardly in the following manner.

Rotation of the drum 122 rotates the cam 164 through rotation of the pinion 118, gear wheel 117 and shaft 112. Rotation of the cam 164 moves the rack 167 downwardly and in doing so rotates the pinion 172 which in turn rotates the ratchet wheel 177 and with it the shaft 173. Rotation of the shaft 173 rotates the drum cam 178 to carry the pin 180 from the outer edge of the cam groove 179 inwardly. The pin 180 through its bifurcated end moves the pin 183 in the arcuate slot 182 and carries the reproducer arm outwardly in view of the pivotal mounting of the reproducer on the boss 19. After a record has been replaced and the rotation of the drum 122 is reversed, rotation of the cam 178 is continued in the same direction whereupon the pin 180 is moved outwardly in the cam groove 179 and brings the reproducer arm back to the position overlying the outer periphery of the record. When this takes place the tripping of the dog 28 by the bell crank arm 187 causes the tilting arm 23 to move downwardly toward the table, and as this action causes the plunger 37 to descend it permits the lowering of the reproducer arm pick-up needle onto the record due to the weight of the reproducer arm upon the plunger 37 of the dash pot 36 which is now unsupported.

Setting of mechanism for either 10″ or 12″ records

The channel member 79 is formed in two sections 79a and 79b which are mounted for sliding engagement in the channel member 80 into which is threaded headed screws 80a and 80b which pass through slots 79c and 79d in the channel members 79a and 79b respectively. Carried by the member 79a and disposed beneath the table 10 is an angular plate 188, one arm 189 of which extends at right angles to the channel member 79a and the other arm 190 extends in parallel relation thereto. The arm 188 has a downwardly extending flange 188a extending along the inner edge thereof. The arm 190 at its free end has a downwardly bent lip 191 and a second downwardly bent lip 192 formed by cutting the material of the arm and bending it downwardly.

Carried by the channel member 79b and disposed in underlying relation to the table and in a common plane with the angular plate 188 is a plate 193 having a cut-out portion 194 into which the arm 190 of the plate 188 extends. The plate 193 also has an arm 195 extending in parallel spaced relation to the arm 188 and is formed with a downwardly extending flange 196. The plate 193 also has an arm 197 extending parallel to the channel member and flanking the arm 190 on the plate 188 and is formed with spaced downwardly directed lips 197a and 198.

Disposed between the flanges 188a and 196 is a link 199 which is pivoted intermediate its ends as at 200 to the underside of the table. Connected to one end of the link 199 is a pin 201 which extends upwardly through an arcuate slot 202 in the table and connected to said pin 201 is one end of a lever 203 which extends across the face of the table and has its opposite end connected to the plate 62. The plate 62 has a laterally extending arm 204 at the outer end of which is an upstanding finger engaging knob 205. Depending from the underside of the plate 62 is a pin 206 which extends through a semi-circular slot 207 in the table and connected to one end of the pin 206 is a tension spring 208, the opposite end of which is connected to an anchoring pin 209 depending from the underside of the table. The plate 62 has a second pin 206a which extends through a slot 207a in the table. It will thus be seen that by shifting the plate 62 from the position shown in Fig. 20 wherein the setting of the parts is for the playing of 10″ records to the position shown in Figs. 1 and 3 where the setting is for 12″ records that the link 199 when shifted will pivot about the point 200 to move the plates 188 and 193 apart and with the movement of said plates will move the channel members 79a and 79b apart so that the record receiving arms carried thereby will be positioned to receive the 12″ records.

Mounted in an angular bracket 210 depending from the underside of the table is a pin 211 to the lower end of which is secured a ring 212 having a radially extending pin 213 adapted for cooperative engagement with a radially extending pin 214 carried by the sleeve 90. Secured to the upper end of the pin 211 is an arm 215 the opposite ends of which are reversely hooked as indicated at 216, as best shown in Fig. 25. The hooked ends 216 engage around the lips 192 and 198 so that as the arm is rotated about the axis of the pin 211 in a counter-clockwise direction as the pin 214 on the sleeve 90 in the course of its rotation engages the pin 213 on the ring 212 the channel members 79a and 79b will be moved apart longitudinally thereby moving the record receiving arms apart a distance sufficient to release a record supported thereby. Suitable spring means (not shown) may be connected to the bracket 210 to return the pin 213 to its normal position. As the rotation of the sleeve 90 is reversed in the operation of the machine it too may be made to move the pin 213 back to its normal position, but as such movement does not cause the arm 215 to return the channel members 79a and 79b back to normal position, supplemental means are employed for this purpose. These supplemental means are in the form of compression springs 217 and 217a positioned about the shaft 77 adjacent each end thereof, one end of the spring 217 bearing against the bearing 78 and the other end abutting against a cross pin 218 mounted in the ends of the shaft 77, while the ends of spring 217a may abut against bearing 84 and the outer end of arm 75. The record release mechanism above described applies to the machine when set for operating upon 10″ records. When operating upon 12″ records it will be remembered that the plates 188 and 193 are longitudinally moved apart a distance of 2″ and when this takes place the lips 192 and 198 ride across the arm 215 and the lips 191 and 197 come into operative engagement with the arm 215.

In the shifting of the setting mechanism from the position for playing 10″ records to that for playing 12″ records or vice versa, the drum cam 179 must also be reset to provide for the proper clearance of the reproducer arm with respect to the periphery of the records on the turntable. To provide for this the drum cam is longitudinally adjustable upon the shaft 173, by a slidable arm 219 one end 220 of which is forked and engages in a grooved hub 221 on drum 178 and the other end of said arm having an edge 222 which is held in engagement with a disk 223 mounted on the pin 206, by means of a tension spring 224, one end of which is anchored to a pin 225 depending from the arm and the other end of which is anchored to a pin 226 depending from the table 10. The arm 219 is slidably supported upon a pair of headed pins 227 and 228 supported by the table and extending through slots 229 and 230 respectively in the arm.

Operation

Recapitulating the operations of the various constituent mechanisms hereinbefore described, the operation of the automatic phonograph is as follows: A stack of records of a common diameter such as 10″ or 12″ are stacked on the turntable to the height of the center pin 13 and the knob 205 is manipulated to set the operative mechanism for the size of the records on the turntable by bringing the parts into the position shown in Figs. 1 and 3 for 12″ records and the position shown in Fig. 20 for 10″ records. The reproducer pick-up needle is then placed upon the sound groove at the beginning of the uppermost record and the switch 72 is flipped to start the motor.

When the reproducer pick-up needle runs into the lead-in groove at the end of the record, the control lever, 43 is operated causing the tilting arm 23 to pivot upwardly and set the dog 28 upright on the supporting arm 29. As this is taking place the record discharge mechanism comes into operation whereby the arm 64 is moved toward the record and the upwardly curved finger 66 and its operating spring finger 67 operate to engage the topmost record of the stack to tilt it over the center pin 13 whereby owing to the rotation of the turntable, the record is discharged therefrom and is received in the grooves 74b and 75b in the record receiving arms 74 and 75 and is held in said arms by the latches 76. As the plate 57 uncovers the nosed end 126 of the lever 127 said nosed end under the force of the springs acting thereon moves outwardly in the slot 126 and sets into operation the automatic means for replacing the record back upon the turntable or for discharging the record onto the record receiving tray 77, depending upon whether the roller 106 on the lever 103 is resting upon a high or a low portion of the star cam 107. Simultaneously with this action the reproducer arm is moved radially outwardly to clear the periphery of the records on the turntable so that replacement of a record upon the turntable can take place without hindrance of the reproducing arm. After a record has been replaced and while the record receiving arms are being returned to their normal position, the drum cam 179 operates to move the reproducing arm radially inwardly to position the pick-up needle over the outermost sound groove of the record. Immediately after this takes place the bell-crank lever 186 operates to trip the dog 28 thereby permitting the reproducing arm to be gradually lowered by the downward movement of the plunger in the dash pot 36 until the pick-up needle engages the record and the playing thereof is proceeded with. Of course at the commencement of the reproduction of a record both sides of which are to be reproduced, the roller 106 should be resting on a low of the cam 107 so as to insure movement of the record receiving arms to replace the record on the turntable. After the first side of the record has been reproduced and the record replaced on the turntable, the cam 107 will have been moved 45° so as to present the roller 106 on the high of the cam so that when the opposite side of the record is reproduced and the record discharged into the receiving arms, said arms will not be operated to replace the record on the turntable but on the contrary the sleeve 90 will be rotated without rotating the shaft 87 and when the arms are operated to release the record said arms will be in normal overlying relation to the receiving tray 76' into which the record will be deposited.

The cycle of operations described will be repeated until both sides of all of the records on the turntable excepting the bottom-most have been reproduced and discharged into the receiving tray. The adjustment and setting of the arm 64 is such that it will fail to engage and remove the bottom-most record on the turntable so that said record will not be removed from the turntable after its top face has been reproduced. However the cycle of movements of the reproducer arm and the other mechanisms of the automatic phonograph will be repeated and in due course will cause the reproducer to be returned to the beginning of the record, the top face of which will be repeatedly reproduced until manually stopped by throwing off the switch 72.

While we have shown and described a preferred embodiment of our invention, it will be understood that we do not desire to be limited to the various specific details and mechanisms disclosed, since these may be modified within the range of engineering skill without departing from the spirit of our invention as defined in the appended claims.

What we claim is:

1. An automatic phonograph of the type comprising a turntable having a central pin adapted to receive a stack of records, a reproducer mounted on an arm laterally of the turntable and movable over the surface of a record mounted on the turntable, means for removing the reproducer from the record, means for peripherally engaging and raising the uppermost record of the stack for freeing it from the pin and causing its lateral discharge from the turntable upon completion of the reproduction of the record, pivotally mounted means normally disposed laterally of and below the turntable for receiving the record upon its discharge from the turntable with the surface last reproduced facing upwardly, characterized in that such phonograph includes record supporting means below said record receiving means, means for selectively operating upon the record receiving means at the completion of the reproduction of the record to alternately operate the record receiving means to move it upwardly about its pivot through an arc of approximately 180° to overlie the turntable to replace the discharged record upon the turntable with the last reproduced surface of the record facing downwardly and to release a record after both sides thereof have been reproduced, so that the record will move by gravity onto the record supporting means below the record receiving means, and means operable upon the completion of the reproduction of a record for controlling the various operations of the aforementioned means in the order recited.

2. An automatic phonograph according to claim 1, wherein the record receiving means is pivotally mounted to move from its normal record receiving position in which it extends laterally outward from the turntable to a record replacing position overlying the turntable in both of which positions it is adapted to support a record and wherein the means for selectively operating upon the record receiving means to replace a record upon the turntable and to release a record onto the record supporting means is operable when the record receiving means is in either of said aforementioned positions.

3. An automatic phonograph according to claim 1, comprising a control shaft, a supplemental shaft adapted to be driven by said control shaft and having mounted thereon the means for selectively operating upon the record receiving means to alternately replace the discharged record upon the turntable with the last reproduced surface of the record facing downwardly and to release the record so that it will move by gravity onto the record supporting means below the record receiving means.

4. An automatic phonograph according to claim 1, comprising a control shaft, a supplemental shaft adapted to be driven by said control shaft and having mounted thereon ratchet means controlled by the control shaft for selectively operating upon the record receiving means to alternately replace the discharged record upon the turntable with the last reproduced surface of the record facing downwardly and to release the record so that it will move by gravity onto the record supporting means below the record receiving means.

5. An automatic phonograph according to claim 1, wherein the record receiving means consist of a pair of arms mounted on a shaft for rotation therewith and movable from a normal record receiving position in which they extend laterally outwardly from the turntable to a record replacing position overlying the turntable, spring means for biasing said arms toward each other, and wherein the means for selectively operating upon the record receiving arms to alternately move them to replace and to discharge the record also operate to move the arms against the tension of the biasing spring means for releasing the record when the arms are in either of the alternate functioning positions.

6. An automatic phonograph of the type comprising a turntable having a central pin adapted to receive a stack of records, a reproducer mounted on an arm laterally of the turntable and movable over the surface of a record mounted on the turntable, means for removing the reproducer from the record, means for peripherally engaging and raising the uppermost record of the stack for freeing it from the pin and causing its lateral discharge from the turntable upon completion of the reproduction of the record, means for receiving the record upon its discharge from the turntable with the surface last reproduced facing upwardly, characterized in that such phonograph includes record supporting means below said record receiving means, means for selectively operating upon the record receiving means at the completion of the reproduction of the record to alternately operate the record receiving means to replace the discharged record upon the turntable with the last reproduced surface of the record facing downwardly and to release a record after both sides thereof have been reproduced, so that it will move by gravity onto the record supporting means below the record receiving means, manual means for varying the adjustment of the record receiving means so that it will operate with either a 10" or a 12" record and means operable upon the completion of the reproduction of a record for controlling the operations of all of the aforementioned means except the means for varying the adjustment of the record receiving means.

7. An automatic phonograph according to claim 6, wherein the record receiving means is pivotally mounted to move from a normal record receiving position in which it extends laterally outward from the turntable to a record replacing position overlying the turntable, in both of which positions it is adapted to support a record and wherein the means for selectively operating upon the record receiving means to replace a record upon the turntable and to release a record onto the record supporting means is operable when the record receiving means is in either of said aforementioned positions.

8. An automatic phonograph of the type comprising a turntable having a central pin adapted to receive a stack of records, a reproducer mounted on an arm laterally of the turntable and movable over the surface of a record mounted on the turntable, means for removing the reproducer from the record, means for periperally engaging and raising the uppermost record of the stack for freeing it from the pin and causing its lateral discharge from the turntable upon completion of the reproduction of the record, pivotally mounted means normally disposed laterally of and below the turntable for receiving the record upon its discharge from the turntable with the surface last reproduced facing upwardly, characterized in that such phonograph includes record supporting means below said record receiving means, means for selectively operating upon the record receiving means at the completion of the reproduction of the record to alternately operate the record receiving means to move it upwardly about its pivot through an arc of approximately 180° to overlie the turntable to replace the discharged record upon the turntable with the last reproduced surface of the record facing downwardly and to release a record after both sides thereof have been reproduced, so that it will move by gravity onto the record supporting means below the record receiving means, a single manually operable means for varying the adjustment of the operative means for peripherally engaging and raising the uppermost record of the stack for freeing it fom the pin and causing the lateral discharge of the record from the turntable upon completion of the reproduction of the record and for the adjustment of the record receiving means so that said last two mentioned means will operate with either a 10" or a 12" record, and means operable upon the completion of the reproduction of a record for controlling the operations of all of the aforementioned means except the manually operable means.

9. An automatic phonograph according to claim 1, including means for moving the reproducer outwardly beyond the periphery of the records on the turntable after the discharge of a reproduced record from the turntable to permit replacing of the reproduced record in reversed position onto the turntable by the record receiving means and means for returning the reproducer in overlying relation to the beginning of the sound groove on a record and lowering said reproducer onto said record.

10. An automatic phonograph of the type comprising a turntable having a central pin adapted to receive a stack of records, a reproducer mounted on an arm laterally of the turntable and movable over the surface of a record mounted on the turntable, means for removing the reproducer from the record, means for peripherally engaging and raising the uppermost record of the stack for freeing it from the pin and causing its lateral discharge from the turntable upon completion of the reproduction of the record, pivotally mounted means normally disposed laterally of and below the turntable for receiving the record upon its discharge from the turntable with the surface last reproduced facing upwardly, characterized in that such phonograph includes means for operating said last mentioned means to move it upwardly about its pivot through an arc of approximately 180° to overlie the turntable to replace the discharged record upon the turntable with the last reproduced surface of the record facing downwardly and means operable upon the completion of the reproduction of a record for controlling the operation of the various aforementioned means in the order recited, said record receiving means consisting of a pair of pivotally mounted arms adapted to be moved from a normal record receiving position in which they extend laterally outward from the turntable to a record replacing position overlying the turntable.

11. An automatic phonograph according to claim 10 further characterized in that the means for operating the record receiving means also functions to move said arms apart to release a record when said arms are in overlying relation to the turntable.

12. An automatic phonograph according to claim 10 further characterized in that the pair of pivotally mounted arms are grooved on their inner faces to accommodate a record and wherein latches are carried by said arms for holding a record stationary within said arms while they are being moved from the normal record receiving position to the record replacing position overlying the turntable.

13. An automatic phonograph of the type described comprising a turntable having a central pin adapted to receive a stack of records, a reproducer mounted on an arm laterally of the turntable and movable over the surface of a record mounted on the turntable, means for removing the reproducer from the record, means for peripherally engaging and raising the topmost record of the stack for freeing it from the central pin and causing the lateral discharge of said record from the turntable upon completion of the reproduction of the record characterized in that such phonograph includes laterally adjustable means for receiving the record upon its discharge from the turntable, means for operating the last mentioned means to replace the discharged record upon the turntable with the last reproduced surface of the record facing downwardly, manual means for varying the adjustment of the record receiving means so that it will operate with either a 10" or a 12" record and means operable upon the completion of the reproduction of a record for controlling the operation of all of the aforementioned means except the means for varying the adjustment of the record receiving means, said adjustable means for receiving the record upon its discharge from the turntable consisting of a pair of arms longitudinally adjustable upon a shaft for rotation therewith and movable from a normal record receiving position in which they extend laterally outward from the turntable to a record replacing position in overlying relation to the turntable, said arms being grooved on their inner faces to accommodate a record and having latches for holding either a 10" or a 12" record stationary with respect to a common center within said arms while they are being moved from the normal record receiving position to the record replacing position overlying the turntable.

WILLIAM A. DE HART.
FREDERICK A. KOLMETZ.